United States Patent [19]
Braglia et al.

[11] Patent Number: 6,014,403
[45] Date of Patent: Jan. 11, 2000

[54] INDUCTION FURNACES FOR THE SYNTHESIS OF GLASSES

[75] Inventors: Marco Braglia; Guojun Dai; Sabrina Mosso, all of Turin, Italy

[73] Assignee: Cselt- Centro Studi e Laboratori Telecomunicazioni S.P.A., Turin, Italy

[21] Appl. No.: 09/108,626

[22] Filed: Jul. 1, 1998

[30] Foreign Application Priority Data

Jul. 29, 1997 [IT] Italy .................................. TO97A0677

[51] Int. Cl.[7] .................................................. H05B 6/02
[52] U.S. Cl. .......................... 373/138; 373/27; 373/151; 65/388; 219/635
[58] Field of Search ........................... 65/388, 32.5, 424, 65/509; 373/137, 30, 39, 138, 139, 140, 151, 156, 59, 27; 219/635, 634

[56] References Cited

U.S. PATENT DOCUMENTS

| | | | |
|---|---|---|---|
| 4,885,019 | 12/1989 | Hutta ........................................... | 65/388 |
| 5,022,044 | 6/1991 | Thomas .................................... | 373/151 |
| 5,308,947 | 5/1994 | Fleming, Jr. .............................. | 219/634 |
| 5,410,567 | 4/1995 | Brundage et al. ........................ | 373/137 |
| 5,526,375 | 6/1996 | Binder et al. ............................. | 373/142 |

FOREIGN PATENT DOCUMENTS

| | | |
|---|---|---|
| 0 517 169 A2 | 12/1992 | European Pat. Off. . |
| 2 589 562 | 5/1987 | France . |
| 1 404 313 | 8/1971 | United Kingdom . |

*Primary Examiner*—Tu Ba Hoang
*Attorney, Agent, or Firm*—Herbert Dubno

[57] ABSTRACT

In an induction furnace for the synthesis of glasses, in particular fluorozirconate glasses for optical fibres for telecommunications, the support device (6') for the crucible (3) is associated with a pair of sleeves (7, 9) between which an annular element (8) which constitutes the actual support element is inserted. The first sleeve (7) has such longitudinal dimensions that the crucible (3) is supported in the annular element (8) in such a way as to be spaced from the planar element (5'), and the second sleeve has such longitudinal dimensions that its top edge is at a level higher than that of the top edge of the crucible (3), to obtain a homogeneous temperature region extending at least along the entire height of the crucible (3).

5 Claims, 2 Drawing Sheets

INDUCTION FURNACES FOR THE SYNTHESIS OF GLASSES

FIELD OF THE INVENTION

The present invention relates to the production of glasses, and more specifically it concerns improvements to induction furnaces for the synthesis of glasses. Preferably, but not exclusively, the glasses in question are glasses for optical fibers for telecommunications, in particular fluorozirconate glasses.

BACKGROUND OF THE INVENTION

To synthesise non-oxide glasses for optical fibers for telecommunications, two types of furnaces are usually used: resistor furnaces and induction furnaces.

Induction furnaces present the advantage of guaranteeing a high heating speed and of favoring the good mixing of the components of the glass, thanks to the agitation induced on the ions present in the molten glass by the magnetic field used for heating. However, the structure of the furnaces is such as to give rise to relatively high temperature inhomogeneity in the mixture (differences in the order of 20–30° C. between the coolest and the hottest point) and this does not allow obtaining a high quality of the glass and, consequently, of the resulting fiber. Moreover, since a lower temperature zone is found just in correspondence with the mouth of the crucible containing the mixture of the glass constituents, in case of mixtures whose constituents easily tend to sublimate (such as, in particular, mixtures for fluorozirconate glasses), sublimated materials are likely to become deposited around this mouth and those materials, when the molten mixture is cast, can introduce impurities in the glass.

Resistor furnaces, on the contrary, homogeneously heat the mixture, but the required temperature is reached more slowly and they do not favor good component mixing. Moreover, it is relatively complex to obtain heating in controlled atmosphere.

BRIEF SUMMARY OF THE INVENTION

The object of the invention is to provide an improved induction furnace wherein the temperature inhomogeneity between different areas of the furnace is eliminated.

The furnace comprises a reactor within which a support device for a crucible containing a mixture of constituents of a glass to be synthesized is arranged, such device presenting in its top part a disk-shaped or planar element. According to the invention this disk-shaped element is associated with a pair of sleeves between which an annular element able to engage the outer wall of the crucible is inserted; the first sleeve has such longitudinal dimensions that the crucible is supported in the annular element in such a way as to be spaced from the planar element, and the second sleeve has such longitudinal dimensions that its top edge is at a level exceeding that of the top edge of the crucible, to define a homogeneous temperature region extending at least along the entire crucible.

BRIEF DESCRIPTION OF THE DRAWING

For the sake of clarification, reference is made to the accompanying drawings, wherein.

DETAILED DESCRIPTION OF THE INVENTION

Figure 1:
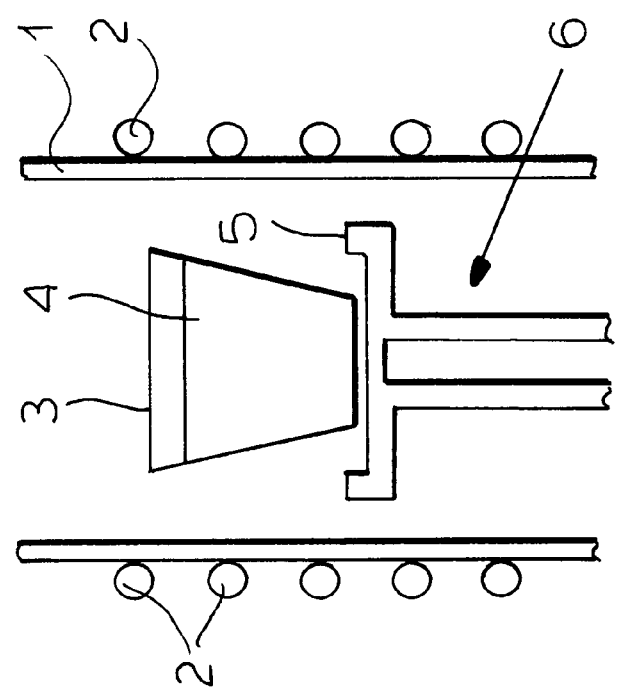
FIG. 1 is a schematic cross-sectional view of a conventional induction furnace.

As shown in FIG. 1, a conventional induction furnace can be represented schematically by a reactor 1, e.g. of $SiO_2$, which a coil 2 is wound. Crucible 3 destined to contain mixture 4 of constituents of the glass to be synthesized is placed inside reactor 1. Crucible 3 is made of a metal having good thermal and electrical conductivity and a melting point such as to allow its use for the preparation of the glasses of interest. For instance, for the preparation of fluorozirconate glasses, crucible 3 is generally made of a Pt/Au alloy (e.g. 95% Pt, 5% Au, percentages in weight). Such crucible, during heating operations, directly rests on the upper plate or disk 5 of a crucible holder or support 6 made of Ni or the like. By this arrangement the glass mixture, in its part near the bottom of crucible 3, is at a lower temperature than that of the upper part of the crucible itself, as a result of the abstraction of heat by the support, with the consequences explained above.

For the sake of drawing simplicity, neither the electrical power supply devices of coil 2, nor the temperature control means generally associated with crucible holder 6 have been shown.

Figure 2:
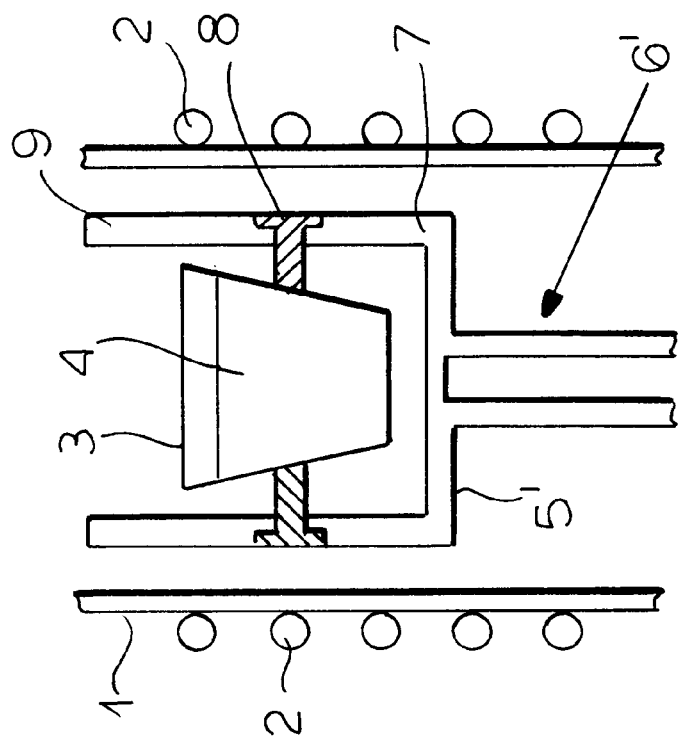
FIG. 2 is a schematic cross-sectional view of an induction furnace comprising the improvements according to the invention.
Figure 4:
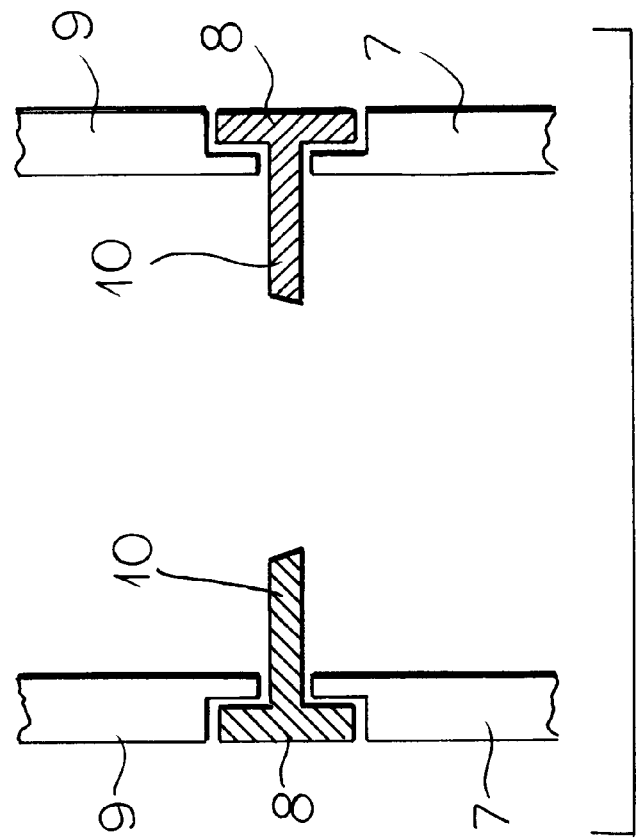
FIGS. 3, 4 are views of some details.
Figure 3:
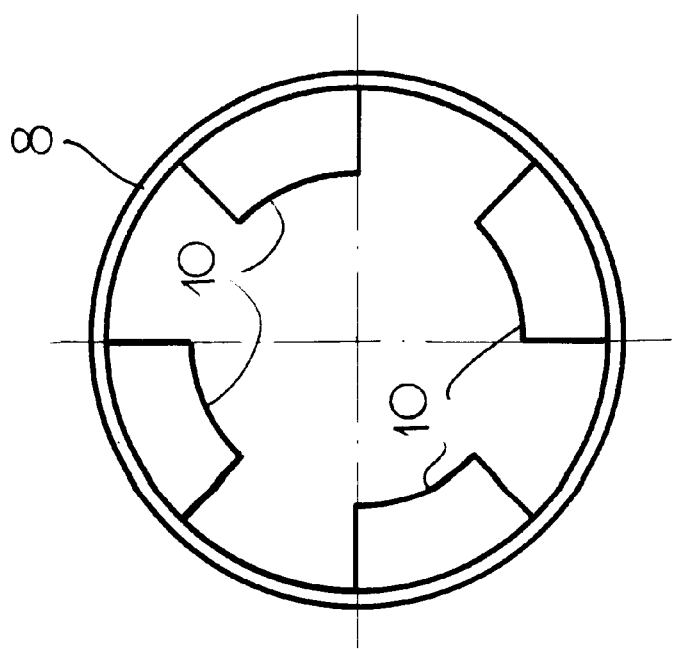

FIGS. 2–4 show the construction of the crucible holder in a furnace according to the invention. As shown, the crucible holder, indicated in this embodiment as 6', is modified, with respect to conventional crucible holder 6, in that plate 5' is associated with two sleeves 7, 9, between which an annular element 8 destined to support the crucible 3 is mounted. Also sleeves 7, 9 and annular element 8 are made of metals having good thermal and electrical conductivity and such melting point as to allow their employment of the preparation of the glasses of interest. In the preferred application of the invention, which concerns a furnace for the production of fluorozirconate glasses for optical fibers for telecommunications, the sleeves can be made for instance of Ni, Pt, Au or alloys thereof.

Sleeve 7 essentially is to serve as a spacer, to maintain the annular element 8 at such a distance from plate 5' that the bottom of crucible 3 does not come in contact with plate 5'. The sleeve can be an integral part of plate 5', so that the top part of crucible holder 6' is essentially cup-shaped, or it can be a distinct element, joined to plate 5' in any convenient way.

Annular element 8, mounted for instance by fitting onto sleeve 7, has a series of internally projecting radial appendages 10, essentially of trapezoidal shape (e.g. four equidistant appendages), and having an oblique terminal surface matching the inclination of the walls of the crucible. The discontinuous construction of the contact surface between the annular element 8 and the crucible 3 has a twofold advantage: 1) it reduces the absorption of the electromagnetic field power by the annular element itself, and 2) if the material of the disk is not the same as that of crucible 3, it reduces the chance that thermal gradients may arise.

The second sleeve 9, mounted in turn e.g. by fitting it onto disk 8, essentially is to extend upwards the region of uniform temperature, in such a way that such region extends at least along the entire height of crucible 3; for this purpose sleeve 9 shall have such longitudinal dimensions that its top edge is at a level higher than that of the top edge of the crucible.

Measures performed by the applicant in the course of the synthesis of fluorozirconate glasses have shown that, by using the crucible holder according to the invention, a temperature difference in the order of 2° C. is obtained between the hottest and the coolest point inside the mixture (brought to 850–900° C.), thus a difference smaller by at least one order of magnitude than that obtainable with conventional induction furnaces. Therefore, with the described arrangement, the drawbacks indicated above are eliminated. A furnace equipped with the crucible holder device according to the invention combines the advantages of induction furnaces with those of resistor furnaces.

It is evident that the description above is given solely by way of non-limiting example and that variations and modifications can be made thereto without thereby departing from the scope of the invention.

We claim:

1. An induction furnace for the synthesis of glasses, comprising a reactor inside which a support device for a crucible containing a mixture of constituents of a glass to be synthesized is arranged, the support device having an upper part formed with a planar element, characterized in that said planar element is associated with a pair of sleeves between which an annular element able to engage the outer wall of the crucible is inserted; and in that a first of said sleeves has such longitudinal dimensions that the crucible is supported in the annular element in such a way as to be spaced from the planar element, and the second of said sleeves has such longitudinal dimensions that its top edge is at a level higher than that of the top edge of the crucible, to obtain a homogeneous temperature region extending at least along the entire height of the crucible.

2. The furnace as claimed in claim 1, characterized in that said annular element has a set of inwardly projecting radial appendages arranged to engage the outer surface of the crucible.

3. The furnace as claimed in claim 1, characterized in that said annular element is fitted into the first sleeve.

4. The furnace as claimed in claim 2, characterized in that said second sleeve is fitted into the annular element.

5. The furnace as claimed in claim 2, characterized in that said first sleeve is an integral part of the planar element.

* * * * *